US010645014B2

United States Patent
Tomici et al.

(10) Patent No.: US 10,645,014 B2
(45) Date of Patent: May 5, 2020

(54) MOBILE NETWORK OPERATOR (MNO) CONTROL OF WIFI QOS BASED ON TRAFFIC DETECTION AND DSCP MAPPING IN TRUSTED WLAN ACCESS AND NETWORKS

(71) Applicant: Convida Wireless, LLC, Wilmington, DE (US)

(72) Inventors: John L. Tomici, Southold, NY (US); Qing Li, Princeton Junction, NJ (US); Michael F. Starsinic, Newtown, PA (US); Paul L. Russell, Jr., Pennington, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 315 days.

(21) Appl. No.: 15/022,939

(22) PCT Filed: Sep. 19, 2014

(86) PCT No.: PCT/US2014/056544
§ 371 (c)(1),
(2) Date: Mar. 18, 2016

(87) PCT Pub. No.: WO2015/042389
PCT Pub. Date: Mar. 26, 2015

(65) Prior Publication Data
US 2016/0234124 A1  Aug. 11, 2016

Related U.S. Application Data

(60) Provisional application No. 61/880,421, filed on Sep. 20, 2013.

(51) Int. Cl.
*H04L 12/857* (2013.01)
*H04W 28/24* (2009.01)
(Continued)

(52) U.S. Cl.
CPC .......... *H04L 47/2491* (2013.01); *H04L 47/14* (2013.01); *H04L 47/2483* (2013.01);
(Continued)

(58) Field of Classification Search
CPC . H04L 12/14; H04L 12/1403; H04L 12/1485; H04W 28/24; H04W 28/08
See application file for complete search history.

(56) References Cited

U.S. PATENT DOCUMENTS

2009/0296613 A1  12/2009  Kahn et al.
2011/0058479 A1 *  3/2011  Chowdhury ............ H04L 45/04
370/237
(Continued)

FOREIGN PATENT DOCUMENTS

EP  2 445 266 A1  4/2012
EP  2 595 440 A1  5/2013
(Continued)

OTHER PUBLICATIONS

Korean Patent Application No. 2017-035579485: Notice of Allowance dated May 22, 2017, 2 pages.
(Continued)

*Primary Examiner* — Khaled M Kassim
*Assistant Examiner* — Syed Ali
(74) *Attorney, Agent, or Firm* — BakerHostetler

(57) ABSTRACT

The quality of service of access to an evolved packet core network provided to a user equipment via a trusted wireless local area network is controlled by a mobile network operator via the provision of a quality of service policy to various network devices, monitoring of the character of data flows to and from the user equipment, and adjustment of differentiated service code point marking and 802.11.e user priority according to the policy.

5 Claims, 7 Drawing Sheets

(51) Int. Cl.
    *H04L 12/801*     (2013.01)
    *H04L 12/851*     (2013.01)
    *H04W 28/08*     (2009.01)
    *H04W 84/12*     (2009.01)

(52) U.S. Cl.
    CPC ........... *H04W 28/08* (2013.01); *H04W 28/24* (2013.01); *H04W 84/12* (2013.01)

(56) References Cited

U.S. PATENT DOCUMENTS

| | | | | |
|---|---|---|---|---|
| 2011/0075675 | A1* | 3/2011 | Koodli | H04L 12/14 370/401 |
| 2012/0287784 | A1* | 11/2012 | Shatzkamer | H04W 28/26 370/230.1 |
| 2013/0322366 | A1* | 12/2013 | Racz | H04W 28/0268 370/329 |
| 2014/0086052 | A1* | 3/2014 | Cai | H04L 47/748 370/235 |
| 2015/0256454 | A1* | 9/2015 | Schliwa-Bertling | H04W 28/10 370/392 |
| 2016/0192199 | A1* | 6/2016 | Alvarez Dominguez | H04W 12/12 455/410 |

FOREIGN PATENT DOCUMENTS

| | | |
|---|---|---|
| JP | 2013-538498 A | 10/2013 |
| KR | 10-2009-0008348 A | 1/2009 |
| KR | 10-2011-0009217 A | 1/2011 |
| KR | 10-2013-0086048 A | 7/2013 |
| WO | WO 2007-121378 A2 | 10/2007 |
| WO | WO 2011-137802 A1 | 11/2011 |
| WO | WO 2012-167184 A2 | 12/2012 |
| WO | WO 2015-042389 | 3/2015 |

OTHER PUBLICATIONS

Kaippallimalil, J. Internet-Draft, "Mapping PMIP Quality of Service in WiFi Network draft-kaippallimalil-netext-pmip-qos-wifi-01", Oct. 20, 2012, 12 pages.
International Application No. PCT/US2014/056544: International Search Report and the Written Opinion dated Mar. 2, 2015, 17 pages.
ZTE, "Analysis of Policy/QoS Control Interfaces for the P4C_TI and P4C_TC", SA WG2 Meeting #92, S2-123118, Jul. 9-13, 2012, Barcelons Spain, 4 pages.
Broadband Forum Technical Report, "Interworking Between Next Generation Fixed and 3GPP Wireless Networks", TR-203, Issue: 1, Aug. 2012, 68 pages.
IEEE Std 802.11 Standard for Information Technology—Telecommunications and Information Exchange Between Systems Local and Metropolitan Area Networks—Specific Requirements, "Part 11: Wireless LAN Medium Access Control (MAC) and Physical Layer (PHY) Specifications", Mar. 29, 2012.
3rd Generation Partnership Project; (3GPP) TS 29.281 V11.6.0, 3rd Generation Partnership Project; Technical Specification Group Core Network and Terminals; General Packet Radio System (GPRS) Tunnelling Protocol User Plane (GTPv1-U) (Release 11), Mar. 2013, 27 pages.
3rd Generation Partnership Project; (3GPP) TS 29.274 V12.1.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Jun. 2013, 228 pages.
3rd Generation Partnership Project; (3GPP) TS 23.203 V12.2.0, 3rd Generation Partnership Project; Technical Specification Group Services and System Aspects; Policy and Charging Control Architecture (Release 12), Sep. 2013, 204 pages.
3rd Generation Partnership Project; (3GPP) TS 23.402 V12.2.0, 3rd Generation Partnership Project; Technical Specification Group Services and System Aspects; Architecture Enhancements for non-3GPP Accesses (Release 12), Sep. 2013, 256 pages.
ZTE, "P4C-TI Evaluation and Conclusion", SA WG2 Meeting #96, S2-131030, Apr. 8-12, 2013, San Diego, US, 3 pages.
3rd Generation Partnership Project; (3GPP) TR 23.852 V12.0.0, 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), Sep. 2013, 157 pages.
3rd Generation Partnership Project; (3GPP) TR 43.902 V11.0.0, 3rd Generation Partnership Project; Technical Specification Group GSM/EDGE Radio Access Network; Enhanced Generic Access Networks (EGAN) study (Release 11), Sep. 2012, 134 pages.
3rd Generation Partnership Project; (3GPP) TS 22.234 V11.0.0, 3rd Generation Partnership Project; Technical Specification Group Services and System Aspects; Requirements on 3GPP system to Wireless Local Area Network (WLAN) interworking (Release 11), Sep. 2012, 15 pages.
3rd Generation Partnership Project; (3GPP) TS 23.234 V11.0.0, 3rd Generation Partnership Project; Technical Specification Group Services and System Aspects; 3GPP system to Wireless Local Area Network (WLAN) interworking; System description (Release 11), Sep. 2012, 84 pages.
3rd Generation Partnership Project; (3GPP) TS 33.402 V12.0.0, 3rd Generation Partnership Project; Technical Specification Group Services and System Aspects; 3GPP System Architecture Evolution (SAE); Security aspects of non-3GPP accesses (Release 12), Jun. 2013, 55 pages.
3rd Generation Partnership Project; (3GPP) TS 43.318 V11.0.0, 3rd Generation Partnership Project; Technical Specification Group GSM/EDGE Radio Access Network; Generic Access Network (GAN); Stage 2 (Release 11), Sep. 2012, 128 pages.
3rd Generation Partnership Project; (3GPP) TR 23.839 V12.0.0, 3rd Generation Partnership Project; Technical Specification Group Services and System Aspects; Study on Support of Broadband Forum (BBF) Access Interworking (Release 12), Jun. 2013, 179 pages.
Japanese Patent application No. 2016-515367: Office Action dated Feb. 22, 2017, 3 pages. (No Translation).
European Patent Application No. 14780999.0: Communication dated Jun. 30, 2017, 8 pages.

* cited by examiner

MOBILE NETWORK OPERATOR (MNO) CONTROL OF WIFI QOS BASED ON TRAFFIC DETECTION AND DSCP MAPPING IN TRUSTED WLAN ACCESS AND NETWORKS

CROSS REFERENCE TO RELATED APPLICATIONS

This application is a National Stage Application filed under 35 U.S.C. 371 of International Application No. PCT/US2014/056544, filed Sep. 19, 2014, which claims the benefit of U.S. Provisional Patent Application Ser. No. 61/880,421, "(Tomici, et al.) filed Sep. 20, 2013, entitled "Mobile Network Operator (MNO) Control of WiFi QoS Based on Traffic Detection and DSCP Mapping in Trusted WLAN Access and Networks," the disclosure of which is hereby incorporated by reference in its entirety.

BACKGROUND

Mobile network operators provide subscribers with managed network access using both cellular and WiFi technologies. Mobile network operators can use WiFi as a way to offload Internet-based traffic for their dual-mode subscribers. In current approaches, a mobile network operator may conditionally configure handset applications to use WiFi for Internet access when WiFi is available. For example, a mobile network may configure applications to use WiFi when the applications are in low mobility scenarios and while they are within a WiFi hotspot.

SUMMARY

Disclosed herein are methods, devices, and systems for controlling the quality of service (QoS) of access to an evolved packet core network (EPC) provided to a user equipment (UE) or other network terminal device via a trusted wireless local area network (WLAN) access network (TWAN). The QoS is controlled by a mobile network operator (MNO) by the provision and distribution of quality of service policy information to various network devices, by monitoring of data traffic flows and their character, and by adjustment of differentiated service code point (DSCP) marking and 802.11.e User Priority (UP) according to the policy information. This QoS management scheme may be used, for example, for offloaded or evolved packet core-routed WiFi traffic to and from the UE or other network terminal device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
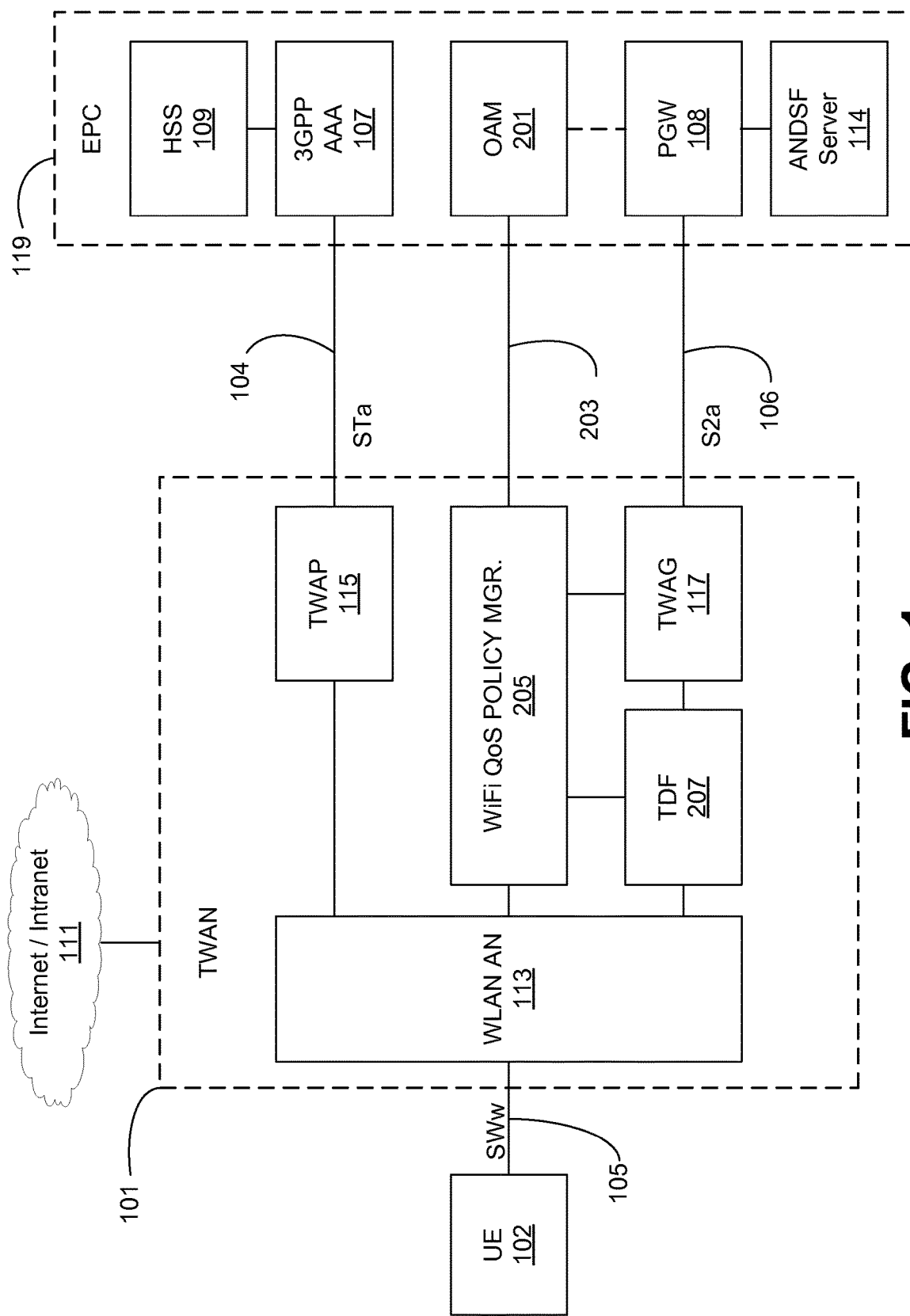
FIG. 1 is a system block diagram depicting a user equipment having access to and evolved packet core network via communication with a TWAN.

Integrated small cell and WiFi (ISW) networks are deployments of small cells in the licensed spectrum along with WiFi access points in the unlicensed spectrum. Mobile Network Operators (MNOs) are beginning to incorporate "carrier-grade" WiFi in ways that complement their cellular and core networks through cost-effective integration and interworking. This may drive development of a variety of network architectures, subscriber service options, and policy management mechanisms.

ISW network requirements are expected to address lower cost alternatives for Internet traffic offload via WiFi, service continuity between cellular and WiFi, simplified network deployment and management (e.g., via consolidation of cellular and WiFi provisioning mechanisms and self-organizing network (SON) extensions), and enhanced policy-based multi-access traffic management (e.g., via dynamic traffic steering and local enforcement of QoS across cellular and WiFi access technologies).

As operators adopt "carrier WiFi" to optimize their networks and reduce expenses, it is expected that there will be a greater deployment of "Trusted" WLAN Access Networks (TWANs) that can interface directly with an operator's Mobile Core Network (MCN). Similarly, it is expected that there will be greater integration of MNO deployed small cell and WiFi access networks within common geographical areas such as high-traffic urban metropolitan hotspot locations. Such integration is motivated by the growing number of smartphones that support both cellular and WiFi access.

In this context, the term "TWAN" refers to the circumstances wherein appropriate measures have been taken to safeguard the EPC from access via the Wireless Local Area Network (WLAN). Such measures are left to the discretion of the MNO and may, for example, include establishment of a tamper-proof fiber connection between the WLAN and EPC, or establishment of an IPSec security association between the WLAN and a Security Gateway at the EPC edge. In contrast, if the WLAN access is deemed "untrusted," the WLAN may interface with an evolved packet core network gateway (PGW) at the EPC edge, and the PGW must establish an IPSec security association directly with each UE accessing the EPC through the WLAN.

Disclosed herein are solutions for MNO control of WLAN QoS via the provision of a quality of service policy to various network devices, monitoring of the character of data flows to and from the user equipment, and adjustment of DSCP marking and user priority mapping, etc., according to the policy. If MNOs deploy carrier WiFi, there may be a desire for access points (Aps) to support at least some 802.11.e802.11.e or WiFi Alliance (WFA) Wireless Multimedia (WMM) QoS features so that the MNOs can offer value-added services via different levels of QoS over WiFi to subscriber user equipments (UEs), such as handsets. TWAN and evolved packet core network (EPC) devices can be configured to automatically provide quality of service policies and to establish DSCP marking according to defaults set by suck. These devices can later adjust the DSCP marking in response to the character of data actually flowing to and from the UEs in accordance with these policies.

To give further context, discussed below are relevant WiFi standards for WLANs QoS and WLANs as associated with 3GPP. 3GPP has specified control mechanisms for various levels of QoS over the cellular access and core network. As detailed herein, these capabilities are extended to include differentiation of WLAN QoS based on MNO requirements as may be similarly applied to cellular access networks.

WiFi may be used for inexpensive delivery of MNO value-added packet data services, including mobile session continuity, via unlicensed spectrum. Adjustments may be made for delivering better QoS for offloaded WiFi traffic depending on how and where the offload is done. For instance, WLANs may support QoS differentiation using the WMM standards based on IEEE 802.11.e. IEEE 802.11.e refers to Amendment 8: Media Access Control (MAC) Quality of Service Enhancements. Applications using the WMM APIs can prioritize 802.11.e MAC frames according to user priorities (UPs) mapped to access categories (ACs) for voice, video, best effort, or background. The four AC queues allow higher priority frames to be transmitted with a statistically lower wait time than lower priority frames.

FIG. 1 illustrates a simplified architecture for a TWAN connected with an EPC. Further details regarding the TWAN are discussed with regard to FIG. 5 through FIG. 7. According to section 16.1.1 of TS 23.402, when the WLAN is considered trusted by the operator, TWAN 101 interfaces with EPC 119 in multiple ways. TWAN 101 may interface with EPC 119 via STa interface 104 for authentication procedures with 3GPP AAA server 107. STa interface 104 securely transports access authentication, authorization, mobility parameters and charging-related information. In addition, TWAN 101 may interface with EPC 119 via S2a interface 106 for bearer management procedures with PGW 108. ANDSF server 114 may be located in EPC 119 and communicate with UE 102 via communicatively connected PGW 108. ANDSF server 114 may initiate a push to distribute its information to UE 102 or UE 102 may query ANDSF server 114 to pull desired information.

TS 23.402 considers the detailed functional split within TWAN 101 as out of scope for 3GPP. The external behavior exposed by the SWw interface 105, S2a interface 106, and STa interface 104 are considered in scope for 3GPP. Nevertheless, functions such as WLAN AN 113, Trusted WLAN Access Gateway (TWAG) 117, and Trusted WLAN AAA Proxy (TWAP) 115 are assumed in scope of TWAN 101. WLAN AN 113 consists of one or more WLAN access points (APs). An AP terminates the UE's WLAN IEEE 802.11 link via SWw interface 105. These could be stand-alone APs or APs connected to a Wireless LAN Controller (WLC), e.g., using IETF CAPWAP/DTLS protocols.

TWAG 117 acts as the default IP router for UE 102 on its access link and terminates the GTP-based S2a interface 106 with PGW 108. It also acts as a DHCP server for UE 102. TWAG 117 maintains a UE MAC address association for forwarding packets between UE 102 and TWAG 117 via a point-to-point link through the AP (not shown) in WLAN 113 and the S2a GTP-u tunnel for UE 102 toward PGW 108. The implementation of the point-to-point link, including how and when it is setup, is out-of-scope of 3GPP (e.g., WiFi procedures are defined by the WiFi Alliance and IEEE 802.11, while WiFi network discovery and selection decisions are based on UE implementation).

TWAP 115 terminates the Diameter-based STa interface 104 with 3GPP AAA Server 107. TWAP 115 relays the AAA information between WLAN AN 113 and 3GPP AAA Server 107 (or Proxy in case of roaming). TWAP 115 establishes the binding of UE 102 subscription data including international mobile subscriber identity (IMSI) with UE 102 MAC address and can inform TWAG 117 of layer 2 attach and detach events. There may be an analogy drawn to 3GPP "attach" which can be viewed as an "authentication" procedure with the core network. TWAP 115 may also provide TWAG 117 with subscription information for UE 102, such as IMSI or MAC bindings.

The 3GPP Release 11 SA2 work item for "S2a Mobility Over GTP" (SaMOG) has focused on enabling a GPRS tunneling protocol (GTP)-based S2a interface between PGW 108 and TWAN 101. The 3GPP Release 11 architectures, functional descriptions, and procedures for GTP-based S2a over Trusted WLAN access were standardized in section 16 of TS 23.402. The applicable GTP control plane protocol for tunnel management (GTPv2-C) is specified in TS 29.274 and the GTP user plane is specified in TS 29.281. A focus of SaMOG is "trusted access to the EPC," hence, the procedures begin with an "initial attachment" to EPC 101. Just as in LTE, successful completion of the initial attach procedure results in establishment of a "default" EPC 101 bearer enabling an "always-on" connection with the core network via a GTP tunnel on S2a interface 106. For SaMOG, direct offload to the Internet 111 is not relevant, because in the situation of direct offload to the Internet 111 the user plane connection to EPC 119 is bypassed and no GTP tunnels are established. Home subscriber server (HSS) 109 or 3GPP AAA server 107 may indicate via STa interface 104 whether access to EPC 119 via S2a interface 106 or the use of non-seamless WLAN offload (NSWO) or both are allowed for a subscriber.

UE 102 initiates an "initial attach" with TWAN 101 using "TWAN-specific L2 procedures" that are outside the scope of 3GPP. For WLAN, this would be via IEEE 802.11 procedures followed by the IETF EAPoL-Start message that initiates EAP procedures with 3GPP AAA server 107 through TWAP 115. By comparison, initiation of an "initial attach" for 3GPP access is done via establishment of an RRC connection with an evolved node B (eNB) followed by 3GPP-specified non-access stratum (NAS) signaling with a mobility management entity (MME).

After standard EAP-based authentication, TWAP 115 provides TWAG 117 with the default access point name (APN) retrieved from HSS subscription data via 3GPP AAA server 107. TWAG 117 then selects PGW 108 associated with the APN and sends a GTP-C "Create Session Request" to PGW 108. This request identifies the RAT type as "Non-3GPP" and includes the Default EPS Bearer QoS (as passed down from HSS 109) and a GTP Tunnel Endpoint Identifier (TEID) for TWAN 101. Note that this QoS is applicable to the GTP tunnel between TWAG 117 and PGW 108 (S2a interface 106)—not to the actual end-to-end EPS bearer which includes the WiFi link, where the WLAN radio interface is considered out of scope for 3GPP. The default bearer QoS includes a QoS Class Identifier (QCI) for a non-guaranteed bit rate (non-GBR). The QCI value represents a resource type (GBR or non-GBR), priority level, packet delay budget, and packet error loss rate, as shown in Table 1 which reflects information from Table 3.9, pg. 57 of "Next Generation Mobile Communications Ecosystem: Technology Management for Mobile Communications by Saad Z. Asif.

The IPv4 address and/or IPv6 prefix is allocated to UE 102 when a new PDN connection is established. For instance, TWAG 117 may request an IPv4 address in the GTP Create Session Request and the IPv4 address is deliv-

TABLE 1

Standardized QCI Characteristics

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS Signalling |
| 6 (NOTE 4) | | 6 | 300 ms | $10^{-6}$ | Video (Buffered Streaming) TCP-based (e.g., www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) TCP-based (e.g., www, e-mail, chat, ftp, p2p file sharing, progressive video, etc.) |
| 9 (NOTE 6) | | 9 | | | |

Notes to Table 1 - Standardized QCI Characteristics
[1] (NOTE 1): A delay of 20 ms for the delay between a PCEF and a radio base station should be subtracted from a given PDB to derive the packet delay budget that applies to the radio interface. This delay is the average between the case where the PCEF is located "close" to the radio base station (roughly 10 ms) and the case where the PCEF is located "far" from the radio base station, e.g. in case of roaming with home routed traffic (the one-way packet delay between Europe and the US west coast is roughly 50 ms). The average takes into account that roaming is a less typical scenario. It is expected that subtracting this average delay of 20 ms from a given PDB will lead to desired end-to-end performance in most typical cases. Also, note that the PDB defines an upper bound. Actual packet delays - in particular for GBR traffic - should typically be lower than the PDB specified for a QCI as long as the UE has sufficient radio channel quality.
[2] (NOTE 2): The rate of non congestion related packet losses that may occur between a radio base station and a PCEF should be regarded to be negligible. A PELR value specified for a standardized QCI therefore applies completely to the radio interface between a UE and radio base station.
[3] (NOTE 3): This QCI is typically associated with an operator controlled service, i.e., a service where the SDF aggregate's uplink/downlink packet filters are known at the point in time when the SDF aggregate is authorized. In case of E-UTRAN this is the point in time when a corresponding dedicated EPS bearer is established/modified.
[4] (NOTE 4): If the network supports Multimedia Priority Services (MPS) then this QCI could be used for the prioritization of non real-time data (i.e. most typically TCP-based services/applications) of MPS subscribers.
[5] (NOTE 5): This QCI could be used for a dedicated "premium bearer" (e.g. associated with premium content) for any subscriber/subscriber group. Also in this case, the SDF aggregate's uplink/downlink packet filters are known at the point in time when the SDF aggregate is authorized. Alternatively, this QCI could be used for the default bearer of a UE/PDN for "premium subscribers".
[6] (NOTE 6): This QCI is typically used for the default bearer of a UE/PDN for non privileged subscribers. Note that AMBR can be used as a "tool" to provide subscriber differentiation between subscriber groups connected to the same PDN with the same QCI on the default bearer.

PGW 108 returns a "Create Session Response" to TWAG 117 including the default EPS Bearer QoS, the allocated UE 102 IP address, and a TEID for PGW 108. A GTP-U tunnel now exists between TWAG 117 and PGW 108. Packets for this EPS bearer are subsequently encapsulated with a GTPv1-U header containing the destination TEID, a UDP header identifying GTPv1-U port number 2152, and an "outer IP" header marked with DSCP values corresponding to the QCI. The DSCP mappings are established based on operator policies.

PGW 108 may also initiate creation of dedicated bearers on the GTP-based S2a interface. TWAN 101 specific resource allocation/modification procedure may be executed in this step in order to support the dedicated bearer QoS. The details of this step are out of the scope of 3GPP.

PGW 108 may also initiate a bearer modification procedure for a GTP-based S2a bearer. This procedure is used to update the TFT for an active default or dedicated S2a bearer, or in cases when one or several of the S2a bearer QoS parameters QCI, GBR, MBR or ARP are modified (including the QCI or the ARP of the default S2a bearer), e.g. due to the HSS Initiated Subscribed QoS Modification procedure.

ered to TWAG 117 during the GTP tunnel establishment via the GTP Create Session Response from PGW 108. When UE 102 requests the IPv4 address via DHCPv4, TWAG 117 delivers the received IPv4 address, subnet mask, default route, DNS server name, etc., to UE 102 within DHCPv4 signaling. UE 102 can use the subnet mask and the default gateway address for its packet routing decisions. Corresponding procedures are also defined for IPv6. For the case of NSWO, it is assumed TWAN 101 can support a network address translation (NAT) function and can provide the UE with a local IP address.

For Trusted WLAN access to EPC 119, the PDN connectivity service is provided by the point-to-point connectivity between UE 102 and TWAN 101 concatenated with S2a bearer(s) between TWAN 101 and PGW 108.

The S2a bearers include a default bearer as a minimum. When the default bearer is modified and/or when dedicated bearers are established, TFTs containing packet filters are also provided. TWAN 101 handles uplink packets based on the uplink packet filters in the TFTs received from PGW 108 for the S2a bearers of the PDN connection. Downlink packets are handled by PGW 108 based on downlink packet filters in the TFTs stored in PGW 108 for the S2a bearers of the PDN connection.

IEEE 802.11.e has standardized two mechanisms for providing QoS enhancements in WLANs, namely, EDCA and HCCA. Subsequently, the WiFi Alliance has adopted some features of the 802.11.e EDCA standard into their Wireless MultiMedia (WMM) certification program. The use of these standards have been limited, mostly focused on vendor-specific enterprise deployments (e.g., for voice over WLAN). It has not typically been used for interworking with 3GPP MNO QoS policies.

IEEE 802.11.e includes MAC capabilities for QoS prioritization in WLANs where transmission opportunities (TXOPs) are determined based on traffic priority. Mechanisms have been standardized using a hybrid coordination function (HCF) in the AP. The HCF may be described as a "hybrid" function because it supports both 1) contention-based channel access (enhanced distributed channel access—EDCA), and 2) controlled channel access (HCF controlled channel access—HCCA). EDCA is a prioritized CSMA/CA contention-based access mechanism. EDCA maps user priorities (UPs) to four Access Categories" (ACs) allowing higher priority frames to be transmitted with a statistically lower wait time than lower priority frames. The backoff value for each AC is broadcast by the QoS-enabled AP in the beacon frames for use by stations in uplink transmissions. HCF Controlled Channel Access (HCCA) is a contention-free access mechanism based on AP polling mechanisms. Although this can theoretically reduce contention on the medium, in reality there can still be uncontrollable interference from overlapping service areas.

The EDCA mechanism provides differentiated, distributed access by mapping eight different UPs to four ACs. The AC is derived from the UPs as shown below in Table 2, which reflects information from Table 9-1 of IEEE Std 802.11™-2012.

TABLE 2

UP-to-AC mappings

| Priority | UP (Same as 802.1D user priority) | 802.1D designation | AC | Designation (informative) |
|---|---|---|---|---|
| Lowest | 1 | BK | AC_BK | Background |
| | 2 | — | AC_BK | Background |
| | 0 | BE | AC_BE | Best Effort |
| | 3 | EE | AC_BE | Best Effort |
| | 4 | CL | AC_VI | Video |
| | 5 | VI | AC_VI | Video |
| | 6 | VO | AC_VO | Voice |
| Highest | 7 | NC | AC_VO | Voice |

The UP values are in the range of 0-7, the same as the values defined for 802.1D user priorities (thereby simplifying the mapping). These user priorities were established for layer 2 data link frame prioritization in alignment with earlier class of service (CoS) standards including 802.1D (based on work done in 802.1p). The 802.1D designations are listed as follows: BK=Background, BE=Best Effort, EE=Excellent Effort, CL=Controlled Load, VI=Video (<100 ms delay), VO=Voice (<10 ms delay), and NC=Network Control. User priority 0 is placed into the Best Effort AC instead of the Background AC to preserve backward compatibility with non-QoS stations since the IEEE considers QoS functionality optional.

The WiFi Alliance (WFA) defined its WiFi MultiMedia (WMM) certification program called WMM-Admission Control (WMM-AC) to ensure that devices requiring QoS (e.g., for VoIP) are only admitted into the network if sufficient resources are available. For example, a WMM client can include a "Traffic Specification" (TSPEC) in a signaling request to the AP before sending traffic flows of a specific AC type, such as voice.

IEEE 802.11u has defined standards for "Interworking with External Networks" such as those managed by 3GPP MNOs. The 802.11u amendment describes methods for WLAN network discovery and selection, QoS mapping from external networks, and prioritized WLAN access for emergency services (e.g., for first responders). The WiFi Alliance has adopted some features of 802.11u network discovery and selection into their Hotspot 2.0 "Passpoint" certification program and the 802.11u QoS enhancements may be addressed in future Passpoint releases.

With respect to QoS mapping, 802.11u provides QoS mapping for subscription service provider networks (SSPNs) and other external networks that may have their own layer-3 end-to-end packet marking practice (e.g., DSCP usage conventions). Therefore, a way to remap the layer-3 service levels to a common over-the-air service level is necessary. The QoS map provides stations and access points with a mapping of network-layer QoS packet marking (e.g., DSCP) to 802.11.e UPs.

For the downlink, at the AP, DSCP values are mapped to EDCA UPs. The non-AP station 802.11 (STA) may also use TSPEC and TCLAS elements in an add traffic stream (ADDTS) request frame to setup a traffic stream in the WLAN. In this method, the UP is specified in the traffic classification (TCLAS) element. The policy used by the AP to choose a specific method to map frames to user priorities is outside the scope of 802.11.

For the uplink, at the non-AP STA, external QoS parameters are mapped to IEEE 802.11 QoS parameters, e.g., DSCP to IEEE 802.11 UP and in turn to EDCA ACs. This mapping helps the non-AP STA to construct correct QoS requests to the AP, e.g., ADDTS Request, and to transmit frames at the correct priority. Standards do not specify how a UE sets the DSCP value for uplink packets, if at all. UE 102 may, for instance, use the value received in the corresponding downlink packet for the corresponding flow.

Table 3, which reflects information from IEEE Std 802.11™-2012 Table V-1, shows examples of differentiated services (DiffServ) per hop behavior (PHB) and DSCP mappings for 3GPP UMTS/GPRS traffic classes and 802.11.e AC and UP. The mapping of the DSCP to 3GPP UMTS/GPRS traffic class is available in Global System for Mobile Association (GSMA) IR.34 v4.6, while IR.34 v9.0 adds the Evolved Packet System (EPS) QoS Class Identifier (QCI) mappings.

TABLE 3

Mapping table of DSCP to 3GPP QoS Information and EDCA ACs

| | | | | 3GPP QoS Information | | | | | |
| --- | --- | --- | --- | --- | --- | --- | --- | --- | --- |
| | | | | QoS Requirement on GPRS Roaming Exchange | | | | EDCA | UP (as in |
| Traffic Class | THP | DiffServ PHB | DSCP | Max Delay | Max Jitter | MSDU Loss | MSDU Error Ratio | Access Category | IEEE 802.Id) |
| Conversational | N/A | EF | 101110 | 20 ms | 5 ms | 0.5% | $10^{-6}$ | AC_VO | 7, 6 |
| Streaming | N/A | $AF4_1$ | 100010 | 40 ms | 5 ms | 0.5% | $10^{-6}$ | AV_VI | 5, 4 |
| Interactive | 1 | $AF3_1$ | 011010 | 250 ms | N/A | 0.1% | $10^{-8}$ | AC_BE | 3 |
| | 2 | $AF2_1$ | 010010 | 300 ms | N/A | 0.1% | $10^{-8}$ | AC_BE | 3 |
| | 3 | $AF1_1$ | 001010 | 350 ms | N/A | 0.1% | $10^{-8}$ | AC_BE | 0 |
| Background | N/A | BE | 000000 | 400 ms | N/A | 0.1% | $10^{-8}$ | AC_BK | 2, 1 |

Table 4 may be constructed for EPC-based networks and reflects information from GSMA IR.34 v9.0.

TABLE 4

2G/3G/EPS QOS information and their mapping to DSCP values

| | QoS Information | | | IP transport | |
| --- | --- | --- | --- | --- | --- |
| EPS QCI | Traffic Class | THP | Signalling indication | Diffserf PHB | DSCP |
| 1 | Conversational | N/A | N/A | EF | 101110 |
| 2 | | | | | |
| 3 | | | | | |
| 4 | Streaming | N/A | N/A | AF41 | 100010 |
| 5 | Interactive | 1 | Yes (see note) | AF31 | 011010 |
| 6 | | | No | AF32 | 011100 |
| 7 | | 2 | No | AF21 | 010010 |
| 8 | | 3 | No | AF11 | 001010 |
| 9 | Background | N/A | N/A | BE | 000000 |

IETF draft-kaippallimalil-netext-pmip-qos-wifi-01, "Mapping PMIP Quality of Service in WiFi Network," outlines a recommended mapping between 3GPP QCI, DSCP, and 802.11.e Access Category (AC) as shown below in Table 5.

TABLE 5

| QCI | DSCP | 802.11.e AC | Example 3GPP service |
| --- | --- | --- | --- |
| 1 | EF | 3 AC_VO | conversational voice |
| 2 | EF | 3 AC_VO | conversational video |
| 3 | EF | 3 AC_VO | real-time gaming |
| 4 | AF41 | 2 AC_VI | buffered streaming |
| 5 | AF31 | 2 AC_VI | IMS signaling |
| 6 | AF31 | 2 AC_VI | buffered streaming |
| 7 | AF21 | 0 AC_BE | interactive gaming |
| 8 | AF11 | 0 AC_BE | web access |
| 9 | BE | 1 AC_BK | e-mail |

Although the WFA has adopted portions of 802.11u for network discovery and selection as part of the Hotspot 2.0 initiative and its corresponding Passpoint certification program, the QoS mapping standards have not been included to date. Hotspot 2.0 refers to an approach to public access Wi-Fi by the WFA allowing devices to automatically join a Wi-Fi subscriber service.

Given the current gaps of the conventional QoS techniques as eluded to above, there may be a need for adjustments that enable greater adoption of WLAN QoS controls, especially with the increased deployment of integrated small cell and WiFi networks. Defined below are ANDSF extensions for conveying "WLAN QoS" parameters (e.g., QoS parameters for WiFi) to be applied by the UE for uplink transmissions or for requesting downlink QoS handling by an AP. As discussed in more detail below, an extension may include the addition of a WLAN QoS parameter, among other things, to the ANDSF Managed Object (MO) for WLAN prioritized access.

3GPP operator's policies for WLAN network selection will be provisioned on 3GPP terminals via pre-configuration or using the Access Network Discovery and Selection Function (ANDSF). The ANDSF was originally defined to provide multi-mode UEs with MNO policies for discovery and selection of non-3GPP access networks such as WLANs. 3GPP TS 23.402 defines the ANDSF functionality, while TS 24.312 defines the ANDSF MO in XML format compatible with OMA-DM standards.

Figure 2:
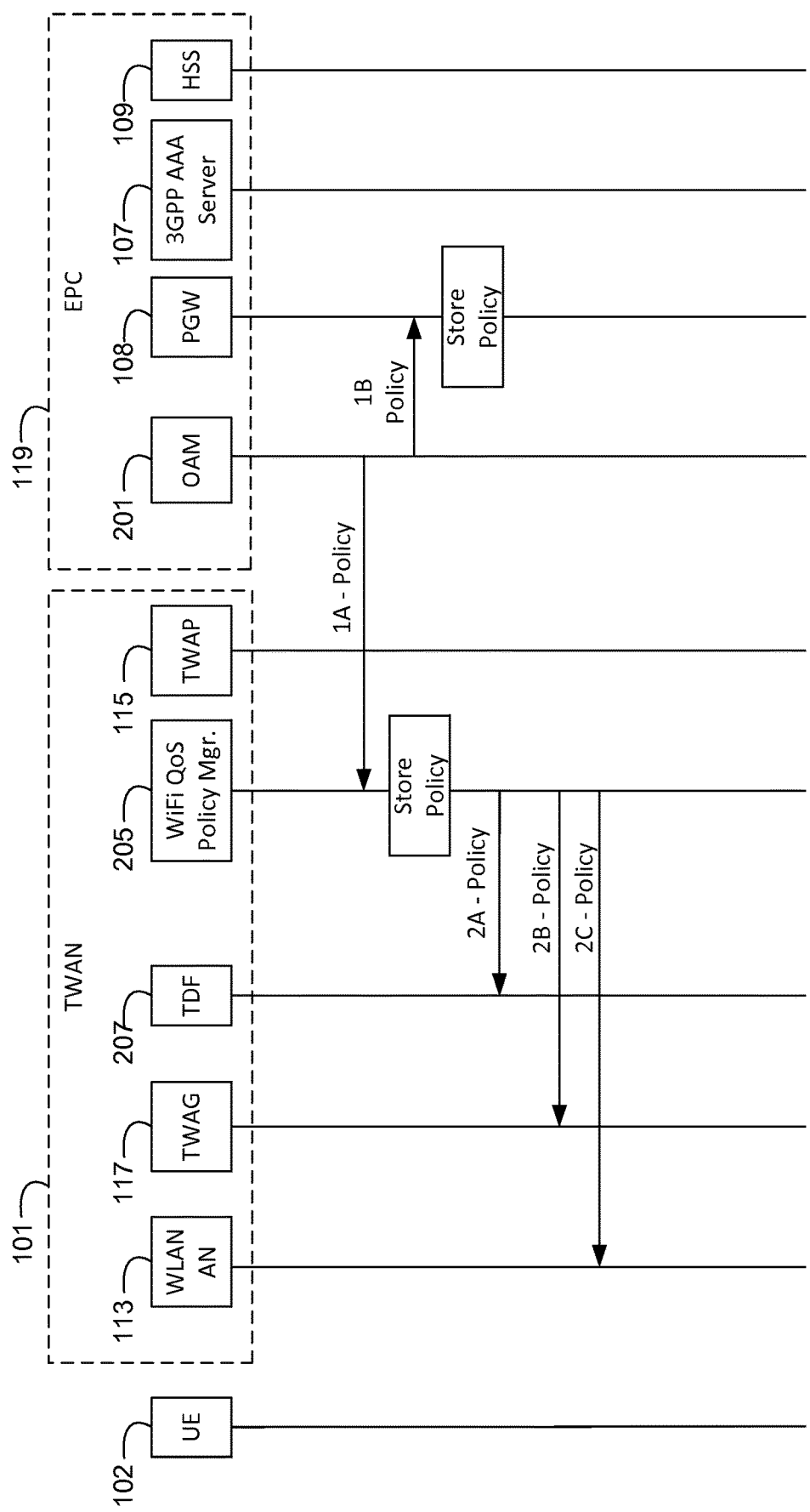
FIG. 2 is a signal flow diagram illustrating a method of establishing default quality of service policies.
Figure 3:
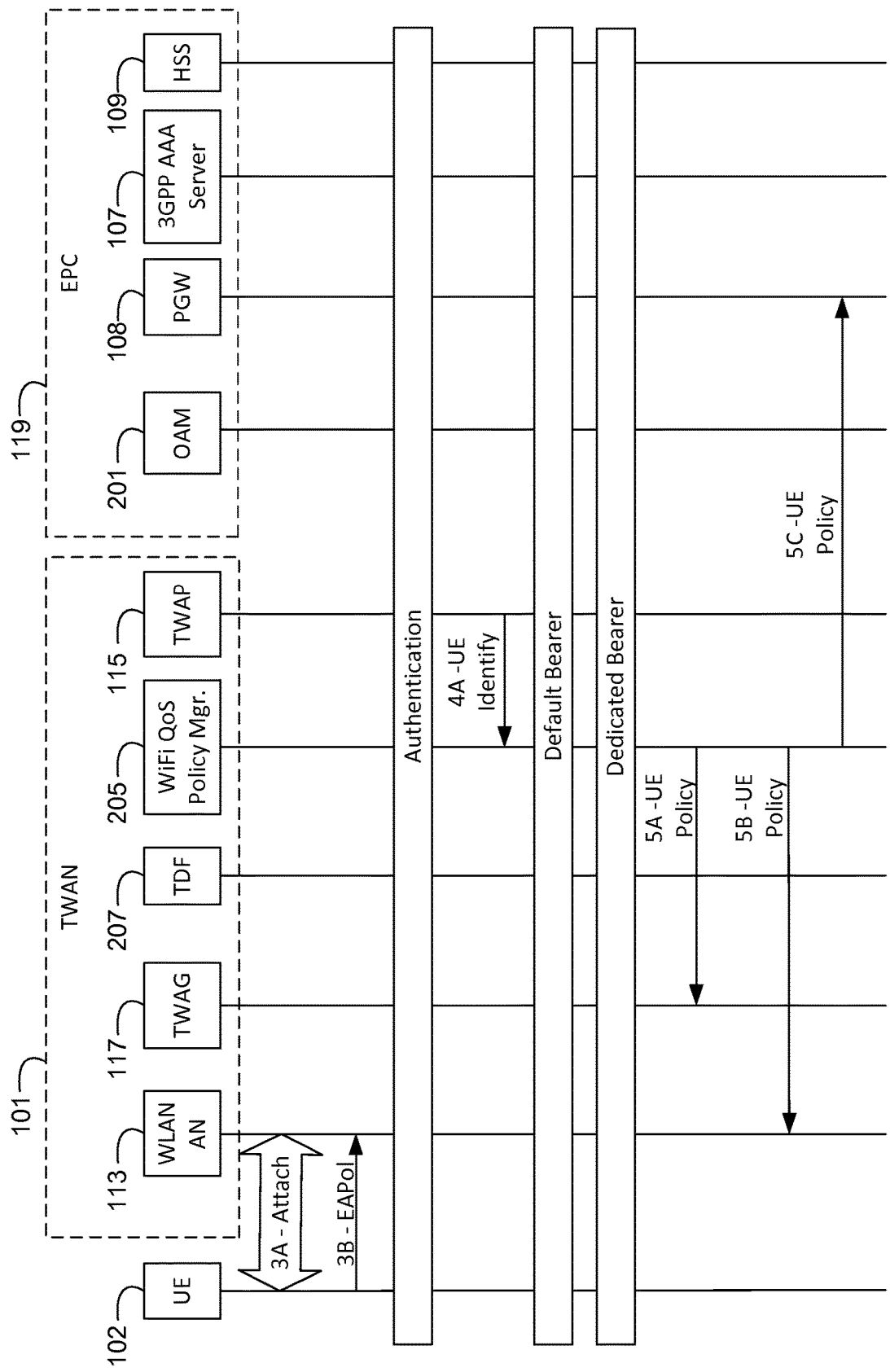
FIG. 3 is a signal flow diagram illustrating the attachment of a user equipment to a TWAN and subsequent authentication and establishment of bearers.
Figure 4:
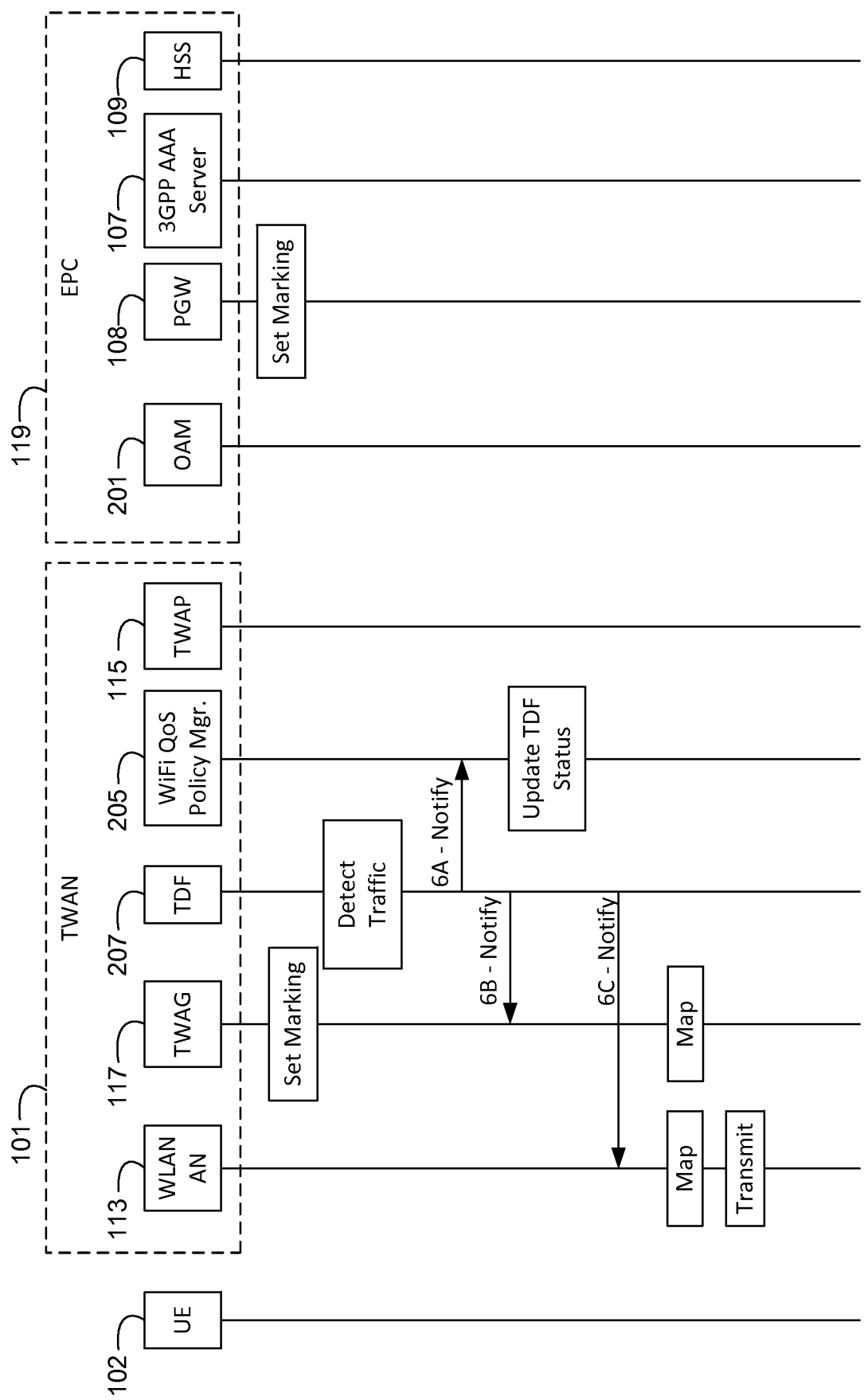
FIG. 4 is a signal flow diagram illustrating a method of setting DSCP marking based on default policies, and subsequently altering marking based on detected traffic.

FIGS. 2, 3 and 4 are signal flow diagrams. As discussed herein, it should be understood that the entities performing the steps illustrated in FIGS. 2, 3, and 4 are logical entities that may be implemented in the form of software (e.g., computer-executable instructions) stored in a memory of, and executing on a processor of, a device, server, or computer system such as those illustrated in FIGS. 6 and 7. That is, the method(s) illustrated in FIGS. 2, 3, and 4 may be implemented in the form of software (e.g., computer-executable instructions) stored in a memory of a computing device, such as the device or computer system illustrated in FIG. 6 or FIG. 7, which computer executable instructions, when executed by a processor of the computing device, perform the steps illustrated in FIGS. 2, 3, and 4.

FIG. 2 is a signal flow diagram illustrating a method of establishing default quality of service policies for a user equipment (UE) 102 in communication with an evolved packet core network (EPC) 119 via a TWAN 101. The UE 102 could, for example, be a network subscriber's mobile device, such as a cellular telephone handset. UEs could equally be any sort of network terminal device, including a machine-to-machine (M2M) network device such as, but are not limited to, tablet computers, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

The TWAN 101 functions include a wireless local area network access network (WLAN AN) 113, a trusted WLAN access gateway (TWAG) 117, a traffic detection function (TDF) 207, a WiFi quality of service (QoS) policy manager 205, and a trusted WLAN authentication, authorization, and accounting proxy (TWAP) 115. These functions can be implemented as logical devices resident on a variety of computer hardware platforms in any combination. For example, each function could be implemented on a separate network computing device, all implemented on a single server, or with some functions packaged together and others independently, etc.

In FIG. 2, the EPC 119 includes an operations, administration, and maintenance device (OAM) 201, an evolved packet core network gateway (PGW) 108, a 3GPP authentication, authorization and accounting (AAA) server 107 and a home subscription system (HSS) 109.

The signal flow begins when OAM 201 sends messages 1A and 1B communicating quality of service policy information to WiFi QoS policy manager 205 and PGW 108, respectively. Messages 1A and 1B may contain identical information, and they may in fact be the same broadcast. Alternatively, they may be tailored for each recipient. The WiFi QoS policy manager 205 and PGW 108 store this information.

Quality of service policy information will normally include both default DSCP marking and 802.11.e user priority settings, as well a mapping of DSCP markings to 802.11.e user priority settings to be used for various types of traffic flow. Default settings would not be specific to a UE. Other policies could be specific to an individual UE or class of UEs. For example, the policies could stipulate different QoS for "gold," "silver," and "bronze" service level customers, for different types of data flows, or different end uses of data.

WiFi QoS policy manager 205 then propagates quality of service policy information to TDF 207, TWAG 117, and WLAN AN 113, in messages 2A, 2B, and 2C respectively. Again, these messages may be the same, identical in content, or tailored for each recipient. The recipients store the information.

The signal flow of FIG. 2 continues in FIG. 3, which illustrates the attachment of the UE 102 to TWAN 101 and subsequent authentication establishment of bearers. The UE 102 attaches to the EPC 119 via TWAN 101. In the example of FIG. 3, UE 102 initiates an initial attach with TWAN 101 using IEEE 802.11 procedures followed by the IETF EAPoL-Start message that initiates EAP procedures with 3GPP AAA server 107 through TWAP 115 via message 3B to WLAN AN 113. The connection of UE 102 is then authenticated. Subsequently, a default bearer is established with EPC 119 over TWAN 101. Optionally, one or more dedicated bearers may be established. If required, subscriber-specific WiFi QoS policies are sent by WiFi QoS policy manager 205 to TWAG 117, WLAN AN 113 and/or PGW 108 via messages 5A, 5B, and 5C respectively. Again, these messages may be the same, identical in content, or tailored for each recipient. The recipients store the information.

The signal flow of FIG. 2 and FIG. 3 continues in FIG. 4. After the establishment of bearers, TWAG 117 sets uplink DSCP values and PGW 108 sets downlink DSCP values in accordance with subscriber-specific QoS policy information provided by WiFi QoS policy manager 205 (in messages 5A and 5C respectively of FIG. 3), if such are provided. If no subscriber-specific QoS policy information is provided, DSCP values are set in accordance with general QoS quality information provided earlier by OAM 201 (in messages 1A, 1B, 2B of FIG. 2), if such are provided.

Next TDF 207 performs packet traffic detection and identification of offloaded and/or EPC-routed traffic to and from UE 102. The detection and identification of traffic may be achieved via deep packet inspection (DPI), shallow packet inspection (SPI), or other traffic identification techniques.

TWAN TDF-based QoS—For either offloaded or EPC-routed traffic, the TWAN policy manager may assign DSCP and downlink 802.11.e UP based on MNO-specified policies for traffic type identified via shallow/deep packet inspection (SPI/DPI) Default policies and subscriber-specific policies may be supported. Note that the EPC QoS case in the first bullet above applies to the entire bearer which may carry many different flows, therefore, using the TDF approach we can further identify specific flows within the bearer for different QoS handling over the WiFi air interface.

If TDF 207 detects a new traffic flow or a new type of traffic flow, it notifies the WiFi QoS policy manager 205, TWAG 117, and WLAN AN 113 via notifications 6A, 6B, and 6C, respectively. Again, these notifications may be the same, identical in content, or tailored for the recipient. Upon receiving flow notifications, the WLAN AN 113 and/or TWAG 117 map DSCP marking to 802.11.e user priority according to the quality of service policy information. The WLAN AN 113 will then transmit downlink media access control (MAC) frames per the access class of the associate uplink traffic flow.

Upon receiving a flow notification 6A from TDF 207, WiFi QoS policy manager 205 may send new or updated QoS policy information to TWAG 117, WLAN AN 113, and/or TDF 207 PGW, through messages (not shown) that are similar to messages 5A, 5B, and 5C of FIG. 3. WiFi QoS policy manager 205 may also send new QoS policy information to TDF 207 via a message (not shown) that is similar to message 2A of FIG. 2.

Figure 5:
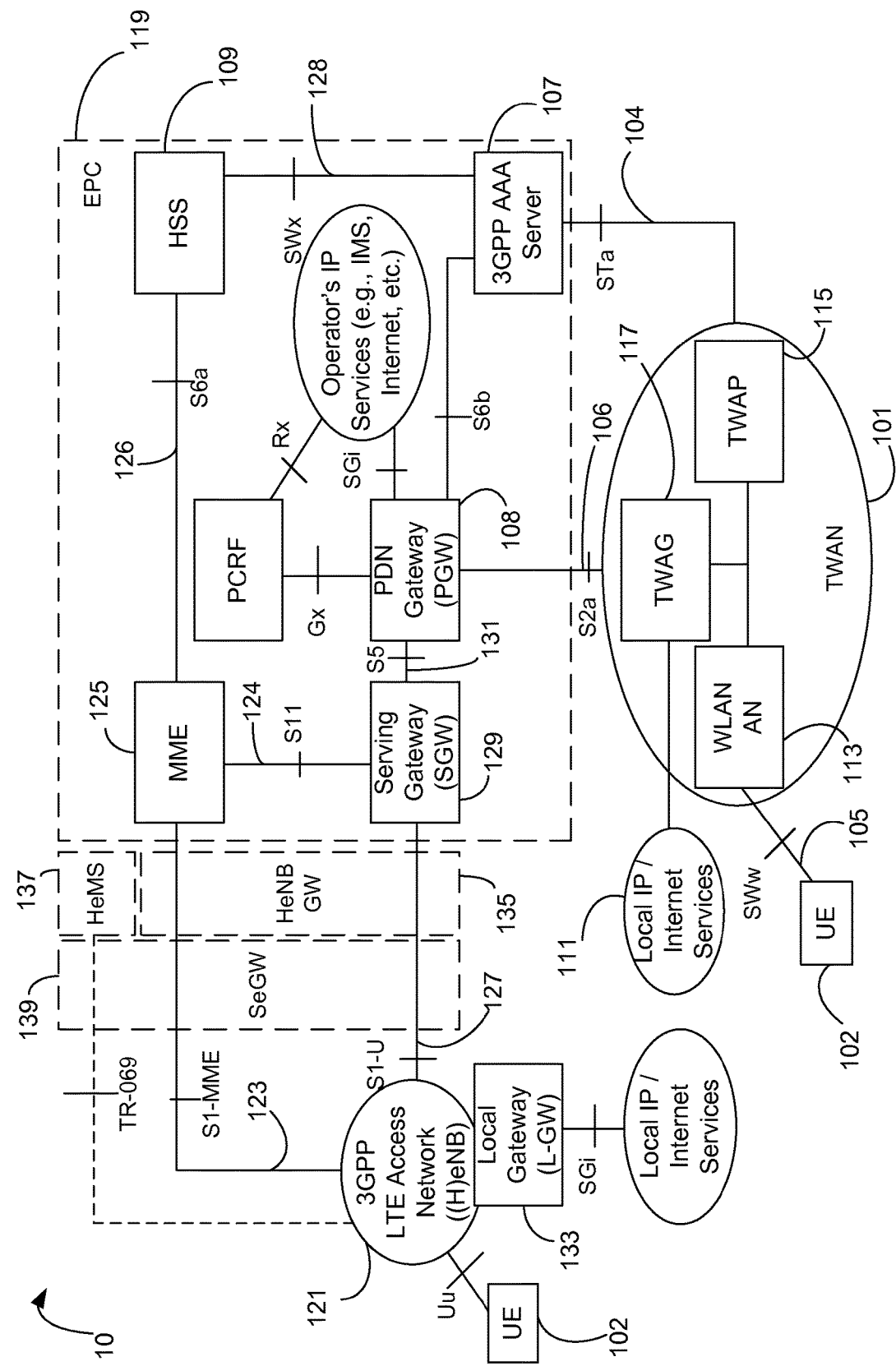
FIG. 5 is a system block diagram illustrating an architecture for TWAN, EPC, and other communications.

FIG. 5 is a diagram of an example communication system 10 in which one or more disclosed embodiments may be implemented. FIG. 5 depicts a 3GPP architecture that provides cellular LTE and Trusted WLAN access to EPC 119. As described in section 16.1.1 of 3GPP Technical Specification (TS) 23.402, the contents of which are hereby incorporated herein by reference, when WLAN AN 113 is considered trusted by the operator, the trusted WLAN access network (TWAN) 101 can be connected to an evolved packet core network (EPC) 119 via the STa interface 104 toward 3GPP AAA server 107 for authentication, authorization, and accounting via the S2a interface 106 toward PGW 108 for user plane traffic flows. An alternate path from TWAN 101 to a local IP network 111 (i.e., intranet) and/or directly to the Internet 111 is also shown.

3GPP LTE access network 121 (i.e., evolved Node B) is connected to EPC 119 via S1-MME interface 123 which provides a communication path with a Mobility Management Entity (MME) 125. S1-U interface 127 provides a communication path with Serving Gateway (SGW) 129, which interfaces with PGW 108 via S5 interface 131.

A "local gateway" function (L-GW) 133 provides small cell LTE access, e.g., for Home eNB (HeNB) deployments. Similarly, a "HeNB Gateway" (HeNB GW) 135 may be used to concentrate control plane signaling for multiple HeNBs toward MME 125 and could also be used to handle HeNB user plane traffic toward SGW 129. A HeNB Management System (HeMS) 137 provides "plug-and-play" auto configuration of HeNBs based on TR-069 standards published by the broadband forum (BBF) and adopted by 3GPP. A security gateway (SeGW) 139 provides trusted access to EPC 119 via HeNB GW 135.

WLAN AN 113 comprises one or more WLAN access points (APs). An AP (not shown) terminates UE 102 WLAN IEEE 802.11 link via SWw interface 156. The APs may be deployed as standalone APs or as "thin" APs connected to a Wireless LAN Controller (WLC) using, for example, the IETF CAPWAP protocols.

TWAG 117 terminates the GTP-based S2a interface 106 with PGW 108 and may act as the default IP router for UE 102 on its WLAN access link. It also may act as a DHCP server for UE 102. TWAG 117 typically maintains a UE MAC address association for forwarding packets between UE 102 (via the WLAN AP) and the associated S2a interface 106 GTP-U tunnel (via PGW 108).

TWAP 115 terminates the Diameter-based STa interface 104 with 3GPP AAA server 107. TWAP 115 relays the AAA information between WLAN AN 113 and 3GPP AAA Server 107 (or Proxy in case of roaming). TWAP 115 can inform TWAG 117 of the occurrence of layer 2 attach and detach events. TWAP 115 establishes the binding of UE subscription data (including IMSI) with UE MAC address and can provide such information to TWAG 117.

In existing systems, UE 102 can leverage USIM features for both 3GPP and non-3GPP WLAN access. Processing for authentication and security is described in section 4.9.1 of 3GPP TS 23.402, the contents of which are hereby incorporated by reference in their entirety. As described therein, non-3GPP access authentication, such as that which takes place via WLAN AN 113, defines the process that is used for access control and thereby permits or denies a subscriber from attaching to and using the resources of a non-3GPP IP access which is interworked with the EPC 119. Non-3GPP access authentication signaling is executed between UE 102 and 3GPP AAA server 107 and HSS 109. The authentication signaling may pass through AAA proxies.

Trusted 3GPP-based access authentication is executed across STa interface 104. The 3GPP based access authentication signaling is based on IETF protocols, e.g., Extensible Authentication Protocol (EAP). STa interface 104 and Diameter application are used for authenticating and authorizing UE 102 for EPC 119 access via trusted non-3GPP accesses. 3GPP TS 29.273, the contents of which are hereby incorporated by reference in its entirety, describes the standard TWAN procedures currently supported on STa interface 104.

For EPC 119 access via GTP-based TWAN 101, the IPv4 address and/or IPv6 prefix is allocated to UE 102 when a new PDN connection is established with EPC 119 over TWAN 101. A separate IP address may also be allocated by TWAN 101 for local network traffic and/or direct Internet offload.

For PDN connectivity through EPC 119 via TWAN 101, TWAN 101 receives relevant PDN information via EAP/Diameter or WLCP signaling. TWAN 101 may request an IPv4 address for UE 102 from PGW 108 via the GTP Create Session Request. The IPv4 address is delivered to TWAN 101 during the GTP tunnel establishment via the GTP Create Session Response. When UE 102 requests an IPv4 address for PDN connectivity via DHCPv4, TWAN 101 delivers the received IPv4 address to UE 102 within DHCPv4 signaling. Corresponding procedures are also defined for IPv6.

For 3GPP LTE access, UE 102 automatically triggers a PDN connection as part of its initial attachment to the EPC 119. UE 102 may subsequently establish additional PDN connections as needed.

The primary purpose of the attach procedure is for UE 102 to register with the network in order to receive services for which it has subscribed to. The attach procedure confirms the user's identity, identifies the services it is allowed to receive, establishes the security parameters (e.g., for data encryption), and notifies the network of UE 102 initial location (e.g., in case it needs to be paged). Also, to support the "always-on" network connectivity expected by today's users, the LTE standards specify establishment of a default PDN connection as part of the Attach procedure. The radio resources for this default connection may be released during periods of inactivity, however the rest of the connection remains intact and the end-to-end connection can be quickly re-established by reassigning the radio resources in response to UE 102 service requests.

When UE 102 attempts to attach to EPC 119 via an (H)eNB LTE network 121, it first establishes an RRC connection with the (H)eNB LTE network 121 and encapsulates the Attach Request within the RRC signaling. (H)eNB LTE network 121 then forwards the attach request to MME 125 via S1-AP signaling on S1-MME interface 123. MME 125 retrieves subscription information from HSS 109 via the S6a interface 126 in order to authenticate UE 102 and allow attachment to EPC 119.

After successfully authenticating UE 102, MME 125 selects SGW 129 (e.g., based on proximity to the (H)eNB LTE network 121), and also selects PGW 108 (e.g., based on the default APN retrieved from HSS 109 or a specific APN requested by UE 102). MME 125 communicates with SGW 129 over S11 interface 124 and requests creation of the PDN connection. SGW 129 executes the signaling to establish a GTP user plane tunnel with the designated PGW 108 over the S5 interface 131.

"GTP control" signaling takes place within the S1-AP protocol between the MME 125 and (H)eNB 121. This ultimately leads to the establishment of a GTP user plane tunnel on the S1-U interface 127 between (H)eNB 121 and SGW 129. The path for the PDN connection between UE 102 and PGW 108 is thus completed through the (H)eNB 121 and SGW 129.

The end-to-end path for the PDN connection between UE 102 and PGW 108 is thus completed through (H)eNB 121 and SGW 129.

In systems where communications take place via TWAN 101, UE 102 authentication and EPC 119 attachment is accomplished via EAP signaling between UE 102 and 3GPP AAA Server 107.

The PDN connectivity service is provided by the point-to-point connectivity between UE 102 and TWAN 101, concatenated with S2a bearer(s) 106 between TWAN 101 and PGW 108. Unlike the LTE model, the WLAN radio resources are "always-on" from an EPC perspective. In other words, any power-saving optimizations are handled transparently using IEEE 802.11 procedures within the WLAN.

When UE 102 attempts to attach to EPC 119 via TWAN 101, it first establishes a Layer 2 connection with WLAN AN 113 and encapsulates EAP messages within EAPoL signaling. WLAN AN 113 forwards the EAP messages to TWAP 115 which encapsulates the messages within Diameter signaling and forwards the messages to 3GPP AAA Server 107 via the STa interface 104. 3GPP AAA server 107 retrieves subscription information from HSS 109 via the SWx interface 128 in order to authenticate UE 102 and allow attachment to EPC 119.

For 3GPP Release 11, 3GPP AAA Server 107 also provides TWAN 101 with information via STa interface 104 for establishing a PDN connection to the default PDN provisioned in HSS 109. TWAN 101 then exercises GTP control plane (GTP-C) and user plane (GTP-U) protocols over S2a interface 106 directly toward PGW 108, thereby completing the PDN connection between UE 102 and PGW 108 through TWAN 101.

For 3GPP Release 12, the SaMOG phase-2 work item defines additional procedures for UE-initiated PDN connectivity, multi-PDN connectivity, and seamless inter-system handover. For the case of single-PDN capable TWAN scenarios, EAP extensions are defined to support UE-initiated PDN requests and seamless inter-system handover requests. For the case of multi-PDN capable TWAN scenarios, a WLAN Control Protocol (WLCP) is defined between the UE and TWAN to enable one or more UE PDN connection requests and seamless handover procedures. However, separate procedures are still utilized between the UE and 3GPP AAA Server for UE authentication.

Figure 6:
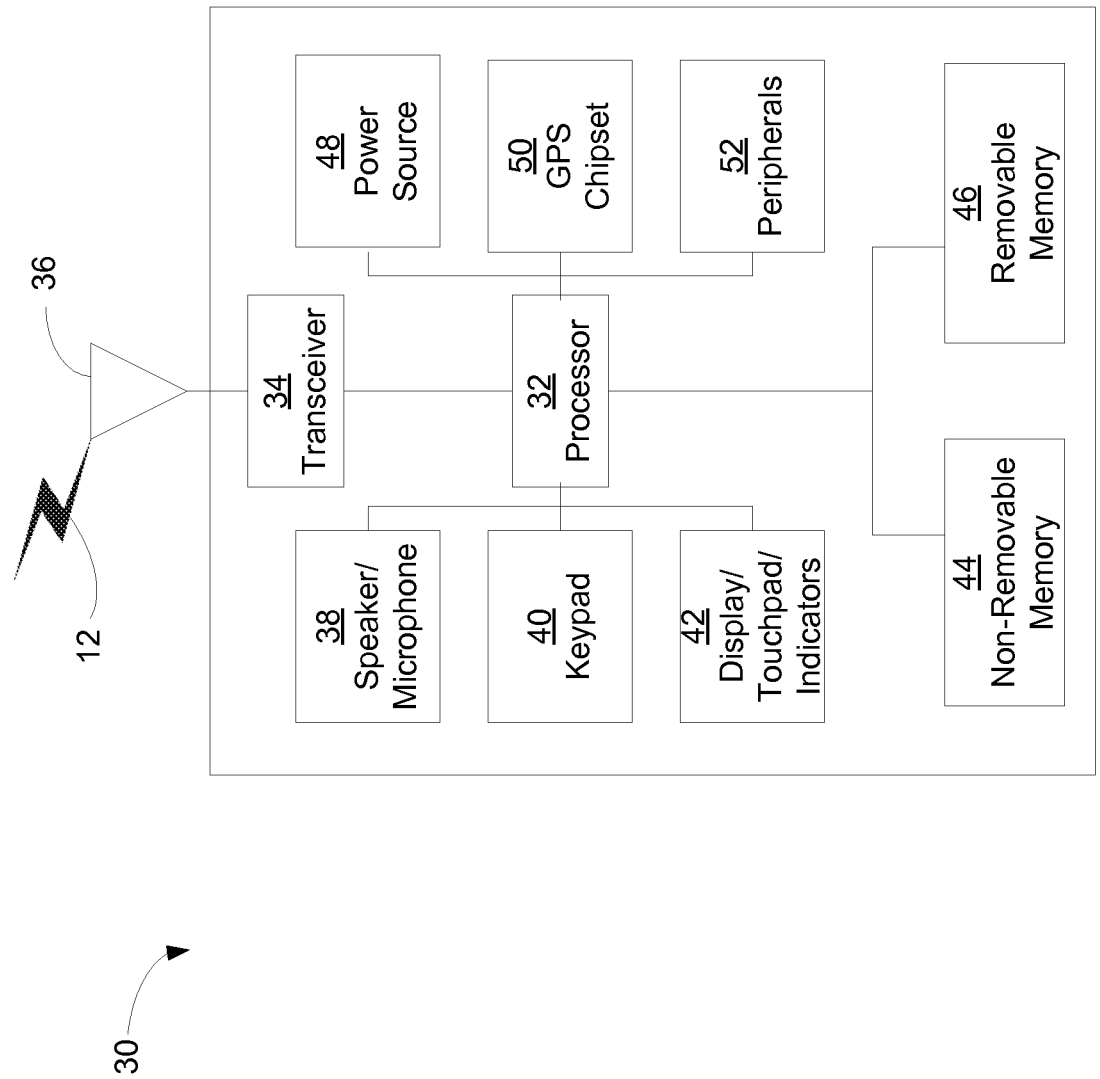
FIG. 6 is a block diagram of a wireless network device suitable for use as a user equipment or other network device.

FIG. 6 is a system diagram of an exemplary network device, such as UE 102. A user equipment (UE) may, for instance, take the form of a mobile station, a fixed or mobile subscriber unit, a pager, a cellular telephone, a personal digital assistant (PDA), a smartphone, a laptop, a netbook, a personal computer, a wireless sensor, consumer electronics, or the like. The computing device architecture in FIG. 6 is generic, and may be used for any number of other network devices, such as, a WiFi quality of service manager, traffic detection device, etc.

As shown in FIG. 6, the device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that device 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 6 depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, e.g., a WLAN AN or (H)eNB. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 6 as a single element, UE 102 may include any number of transmit/receive elements 36. More specifically, UE 102 may employ MIMO technology. Thus, in an embodiment, UE 102 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, device 30 may have multi-mode capabilities. Thus, transceiver 34 may include multiple transceivers for enabling device 30 to communicate via multiple RATs, such as UTRA and IEEE 802.11, for example.

Processor 32 may access information from, and store data in, any type of suitable memory, such as non-removable memory 44 and/or removable memory 46. Non-removable memory 44 may include random-access memory (RAM), read-only memory (ROM), a hard disk, or any other type of memory storage device. Removable memory 46 may include a subscriber identity module (SIM) card, a memory stick, a secure digital (SD) memory card, and the like. In other embodiments, the processor 32 may access information from, and store data in, memory that is not physically located on device 30, such as on a server or a home computer. The processor 32 may be configured to control lighting patterns, images, or colors on the display or indicators 42 in response to various user requests, network conditions, quality of service policies, etc.

The processor 32 may receive power from the power source 48, and may be configured to distribute and/or control the power to the other components in device 30. The power source 48 may be any suitable device for powering device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of device 30. It will be appreciated that device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 7:
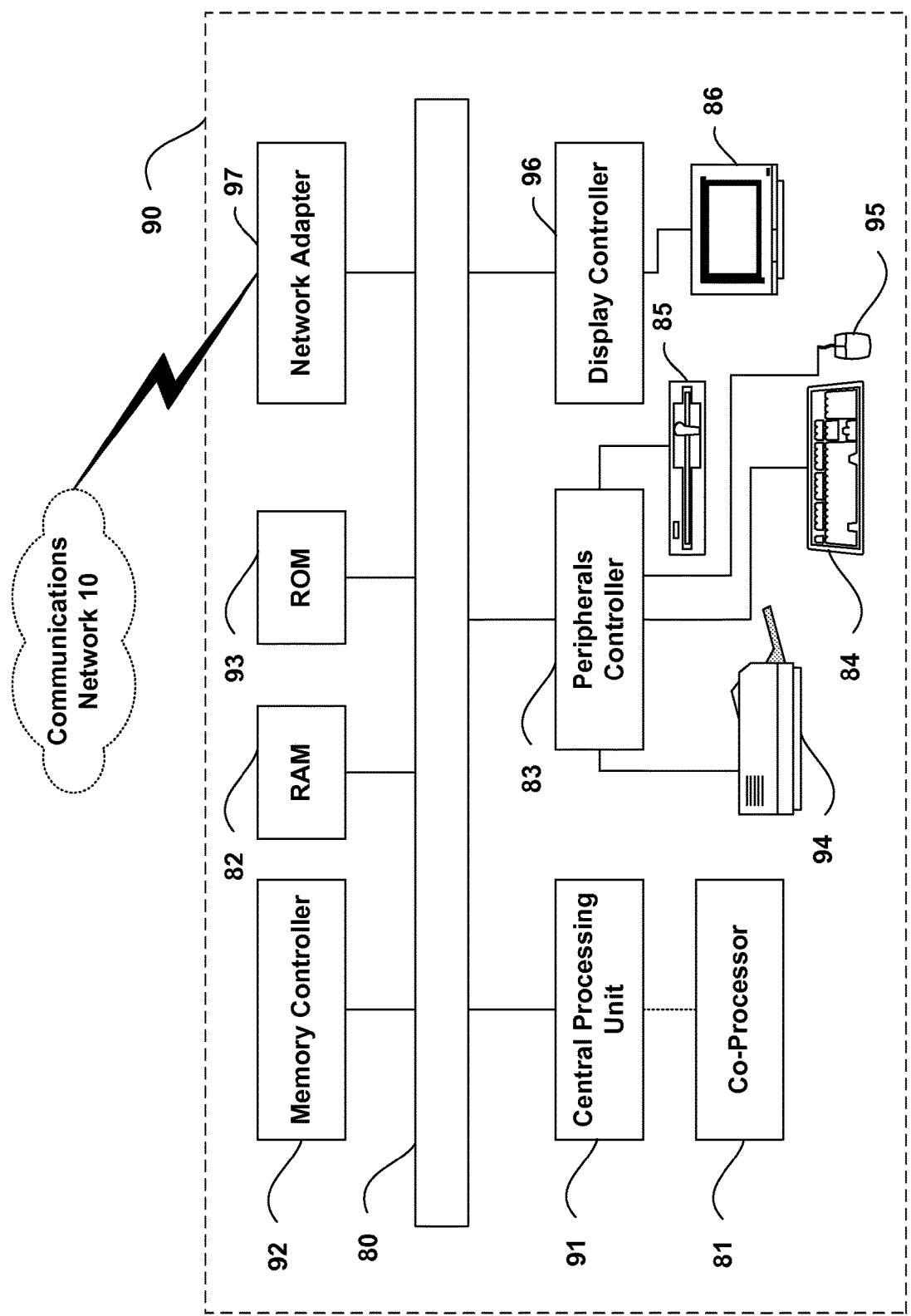
FIG. 7 is a block diagram of an exemplary computing system for implementing various network functions.

FIG. 7 is a block diagram of an exemplary computing system 90 on which, for example, various aspects of the communication system 10 of FIG. 5 and the system of FIG. 1 may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as a WLAN AN.

It is understood that any or all of the systems, methods and processes described herein may be embodied in the form of computer executable instructions (i.e., program code) stored on a computer-readable storage medium which instructions, when executed by a machine, such as a computer, server, UE, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A traffic detection device comprising a processor and a memory coupled with the processor, the memory having stored thereon executable instructions that when executed by the processor cause the traffic detection device to effectuate operations comprising:
   receiving, from a policy manager before a data flow is established, a quality of service policy, the quality of service policy relating to traffic that is carried in the data flow, the quality of service policy being specific to a class of user equipment, wherein the policy manager receives the policy from an operations, administration, and maintenance (OAM) apparatus;
   performing a shallow packet inspection of offloaded traffic to detect a character of the data flow, where the offloaded traffic is received from an access network;
   identifying, according to the quality of service policy and the character of the data flow, a need for a different quality of service handling of the data flow; and
   sending, to an access network and an access network gateway, a notification, the notification pertaining to a need for a different quality of service handling of the data flow, wherein the notification comprises an indication of a change in a priority of the data within the access network.

2. The traffic detection of device of claim 1, wherein the quality of service policy is specific to a user equipment.

3. A method of managing WiFi quality of service in a network, the method comprising:
   receiving, from a policy manager before a data flow is established, a quality of service policy, the quality of service policy relating to traffic that is carried in the data flow, the quality of service policy being specific to a class of user equipment, wherein the policy manager receives the policy from an operations, administration, and maintenance (OAM) apparatus;
   performing a shallow packet inspection of offloaded traffic to detect a character of the data flow, where the offloaded traffic is received from an access network;

identifying, according to the quality of service policy and the character of the data flow, a need for a different quality of service handling of the data flow; and when a change in the character of the data flow requires a different treatment of the data flow in accordance with the quality of service policy, sending a notification to the access network of the character of the data flow, wherein the notification comprises an indication of a change in a priority of the data within the access network.

4. A traffic detection device comprising a processor and a memory coupled with the processor, the memory having stored thereon executable instructions that when executed by the processor cause the traffic detection device to effectuate operations comprising:

receiving, from a policy manager before a data flow is established, a quality of service policy, the quality of service policy relating to traffic that is carried in the data flow, the quality of service policy being specific to a class of user equipment, wherein the policy manager receives the policy from an operations, administration, and maintenance (OAM) apparatus;

performing a shallow packet inspection of evolved packet core network (EPC) routed traffic to detect a character of the data flow, where the EPC routed traffic is received from an access network;

identifying, according to the quality of service policy and the character of the data flow, a need for a different quality of service handling of the data flow;

sending, to an access network and an access network gateway, a notification, the notification pertaining to a need for a different quality of service handling of the data flow, wherein the notification comprises an indication of a change in a priority of the data within the access network.

5. The traffic detection of device of claim 4, wherein the quality of service policy is specific to a user equipment.

* * * * *